April 20, 1943.   W. F. GROENE ET AL   2,317,099
STEP THREADING MACHINE
Filed June 11, 1942   9 Sheets-Sheet 5
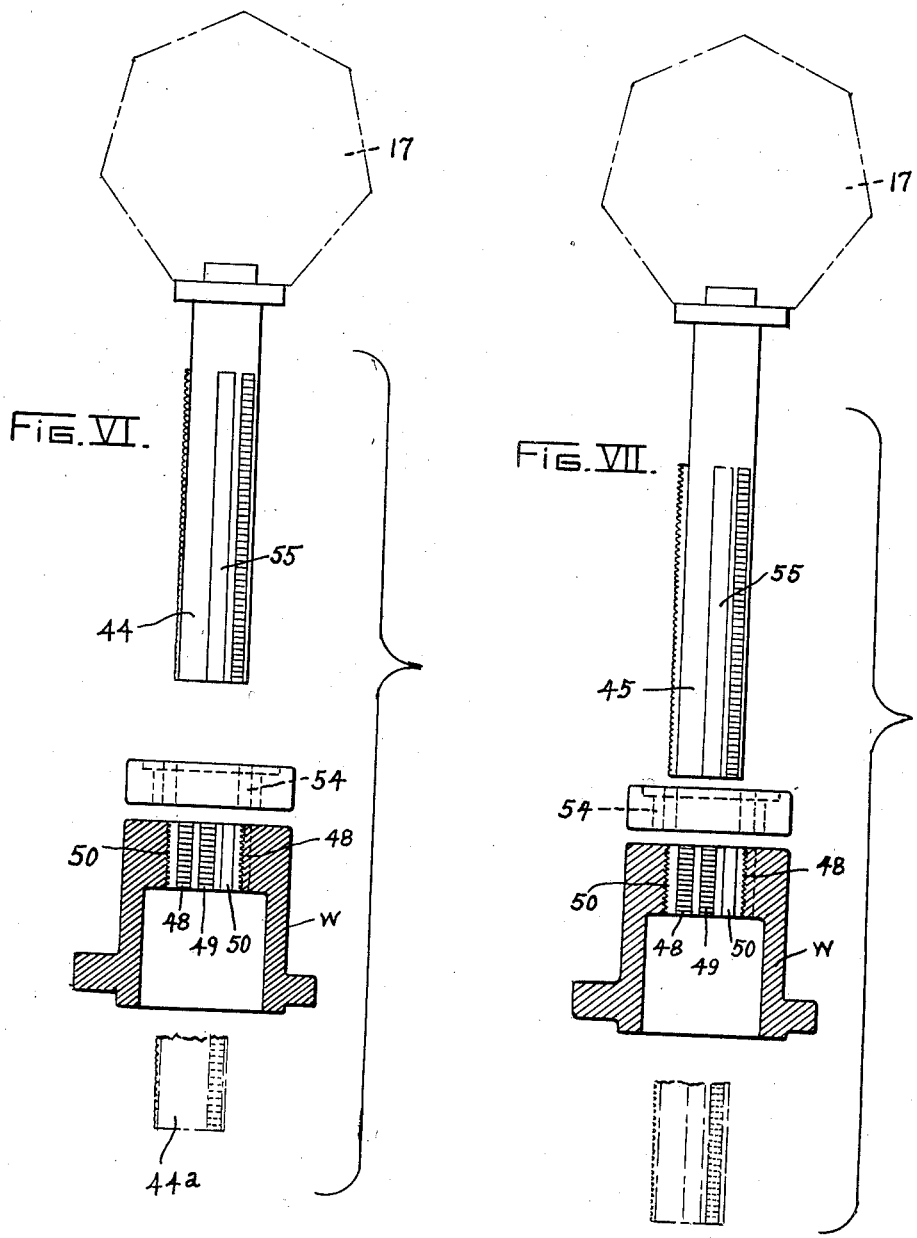
INVENTORS.
WILLIAM F. GROENE
HAROLD J. SIEKMANN
BY Willard S. Groene April 20, 1943.    W. F. GROENE ET AL    2,317,099
STEP THREADING MACHINE
Filed June 11, 1942    9 Sheets-Sheet 6
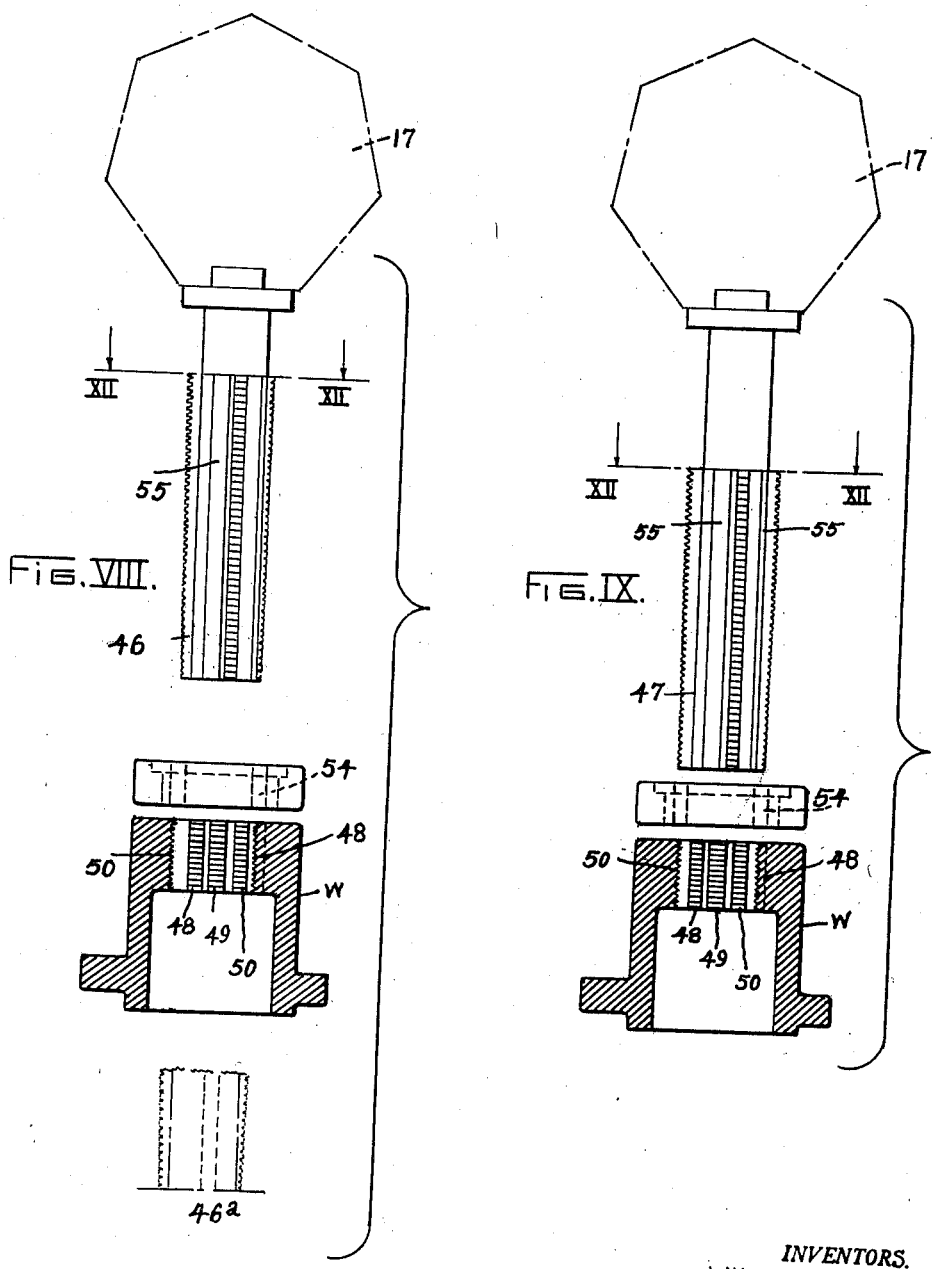
INVENTORS.
WILLIAM F. GROENE
BY   HAROLD J. SIEKMANN

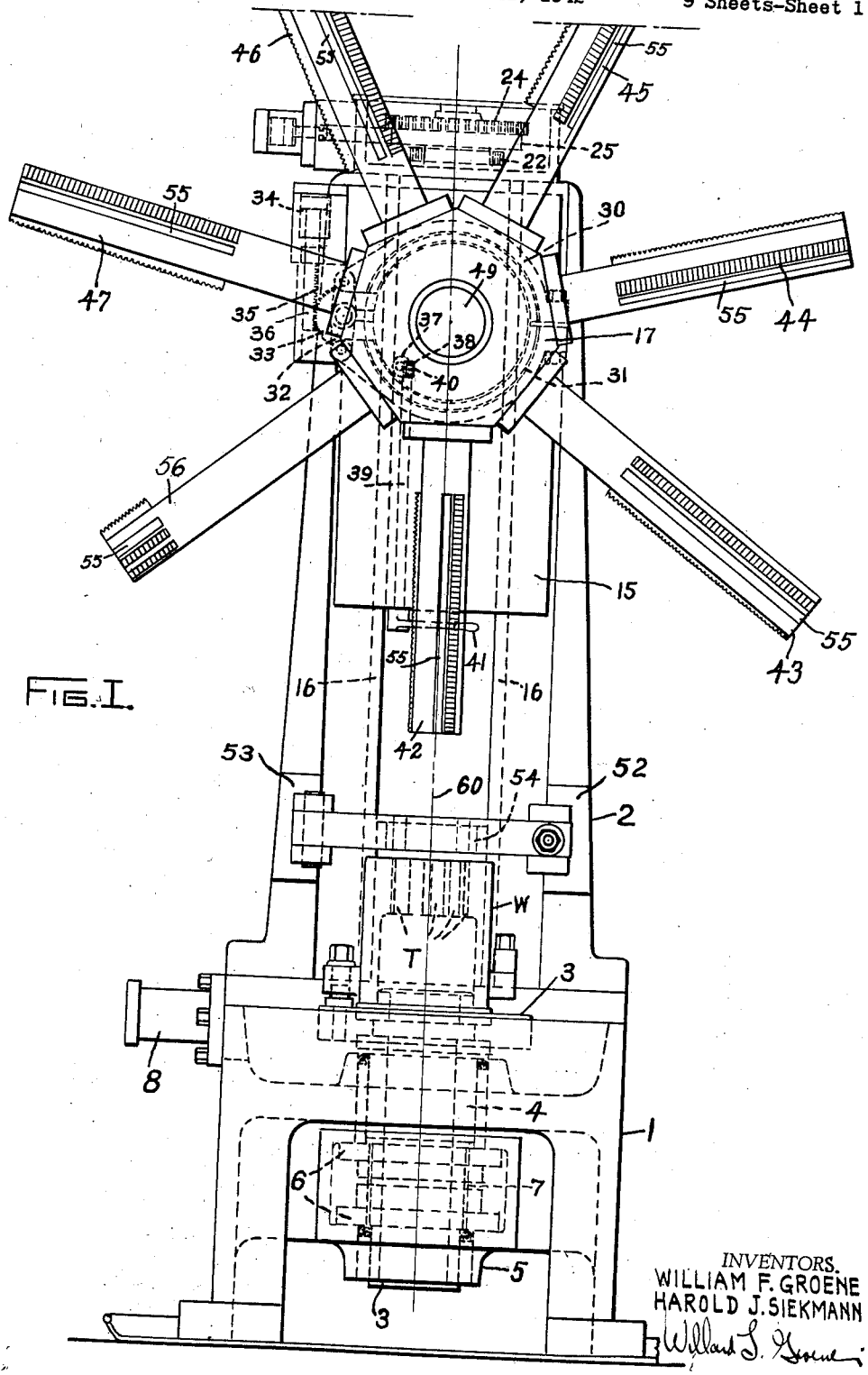
Fig. I.

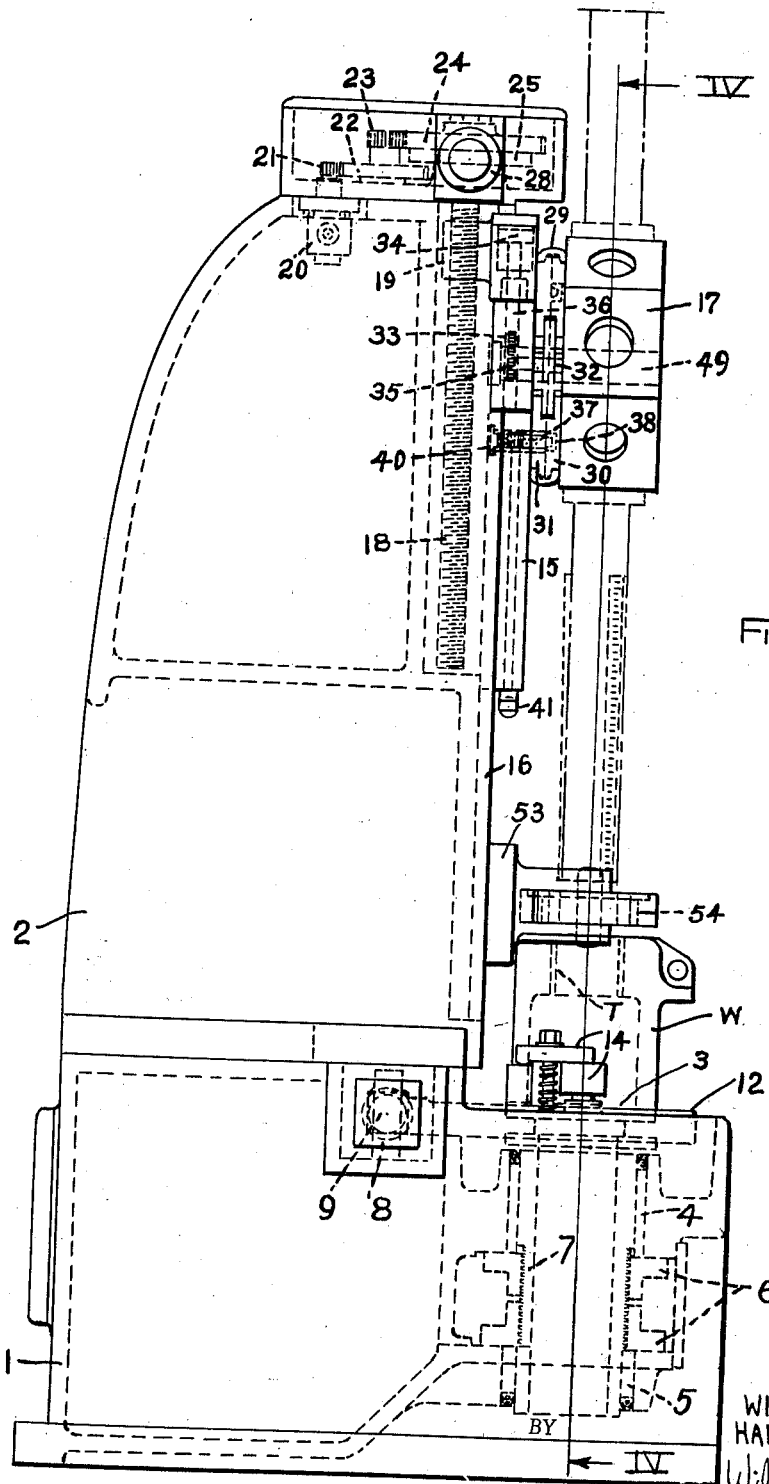

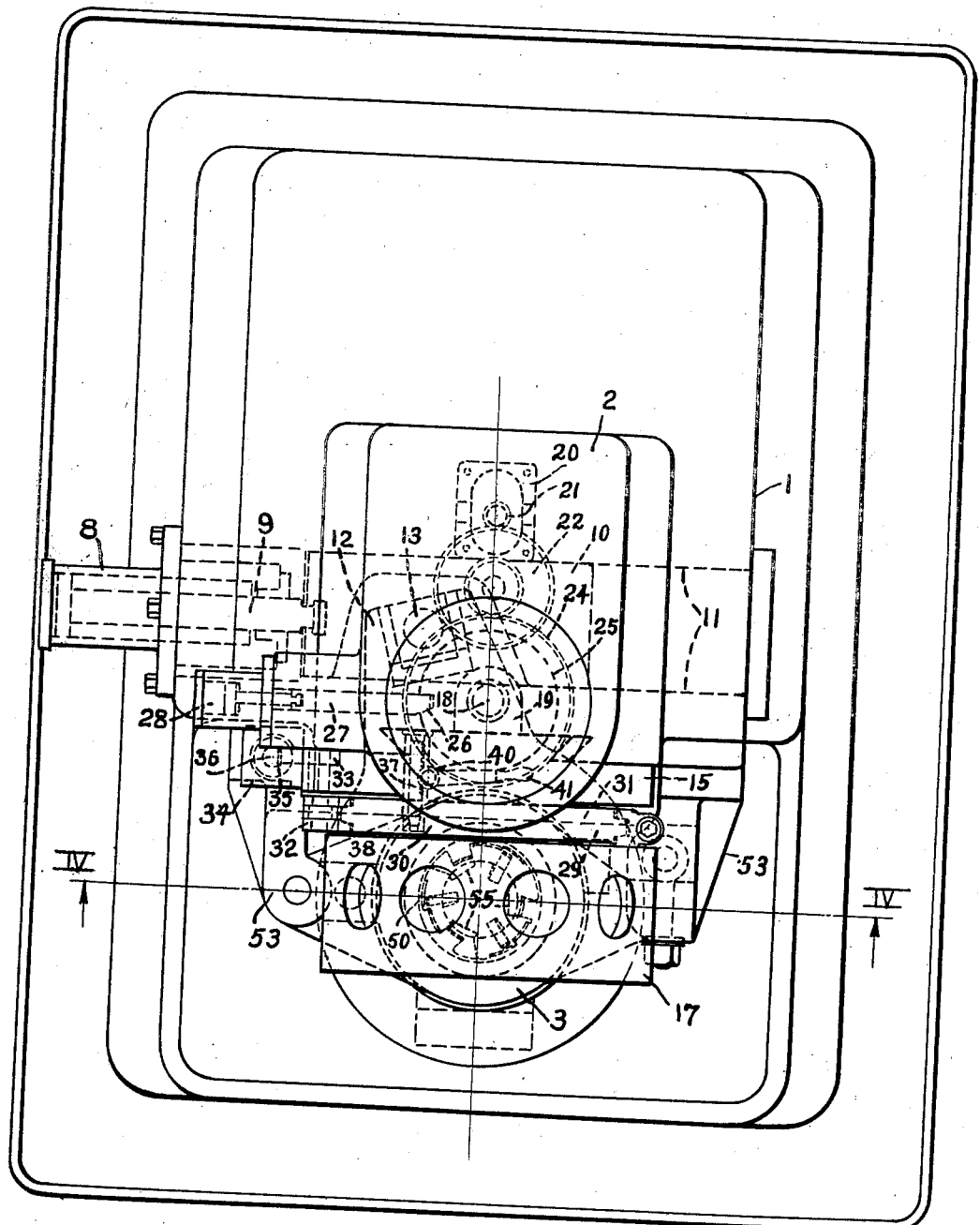
Fig. III.

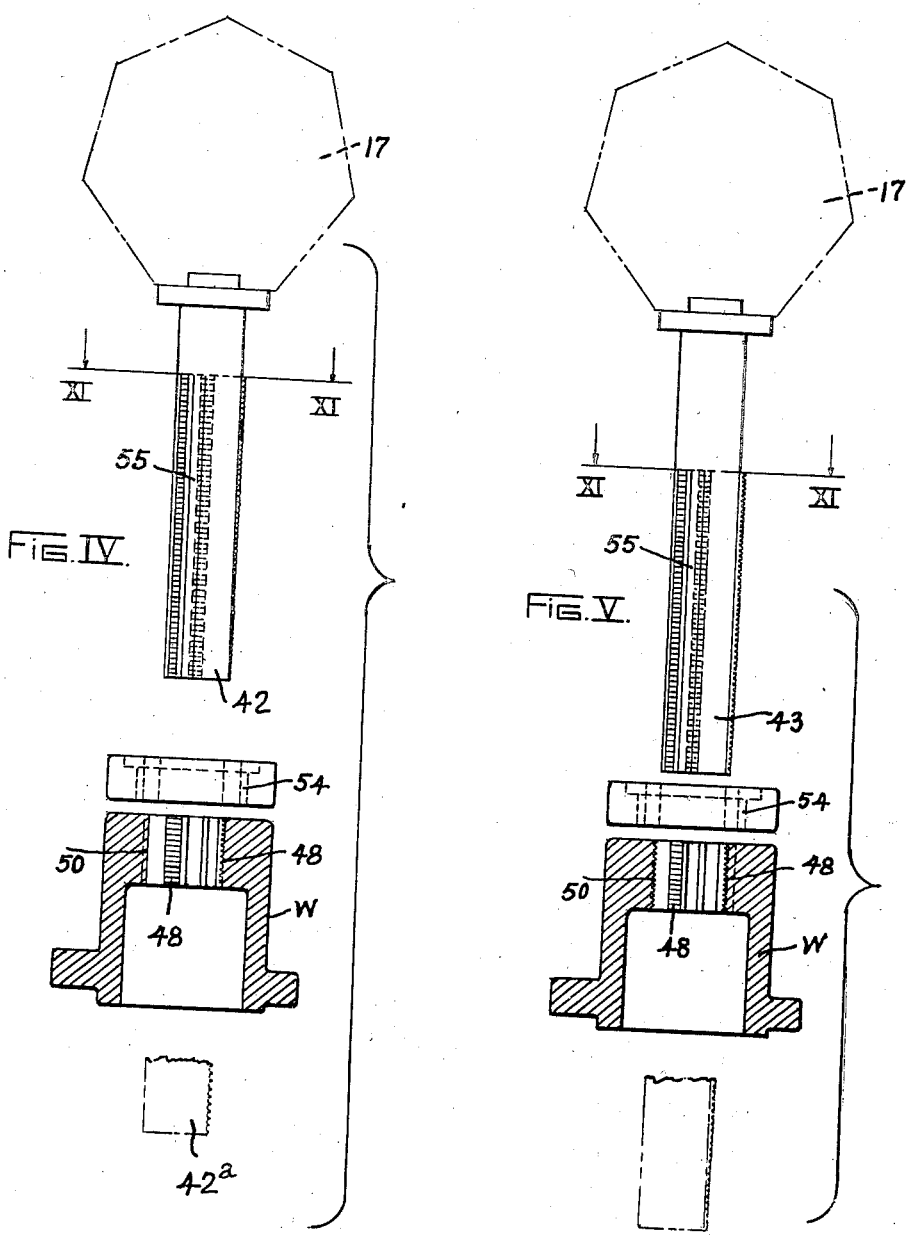

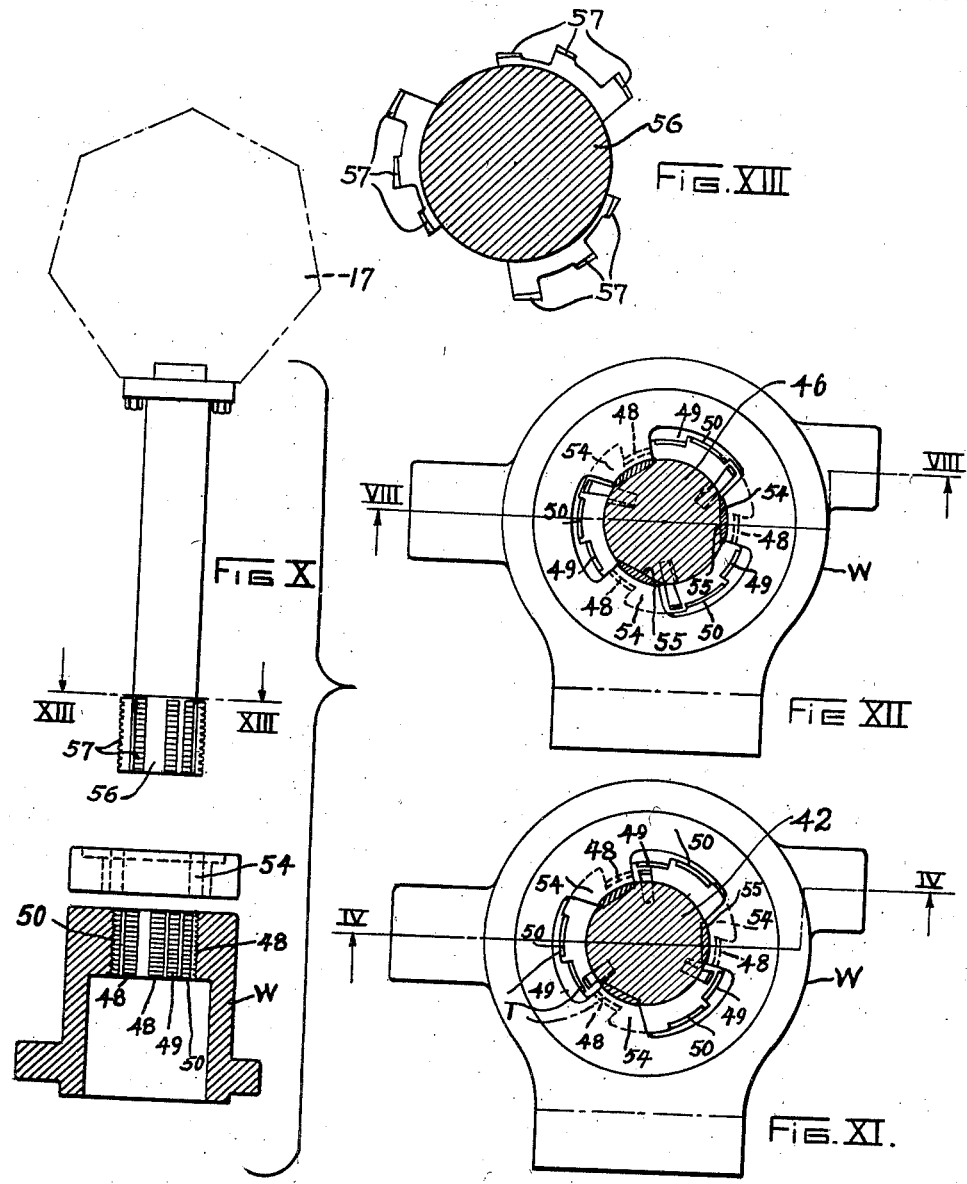

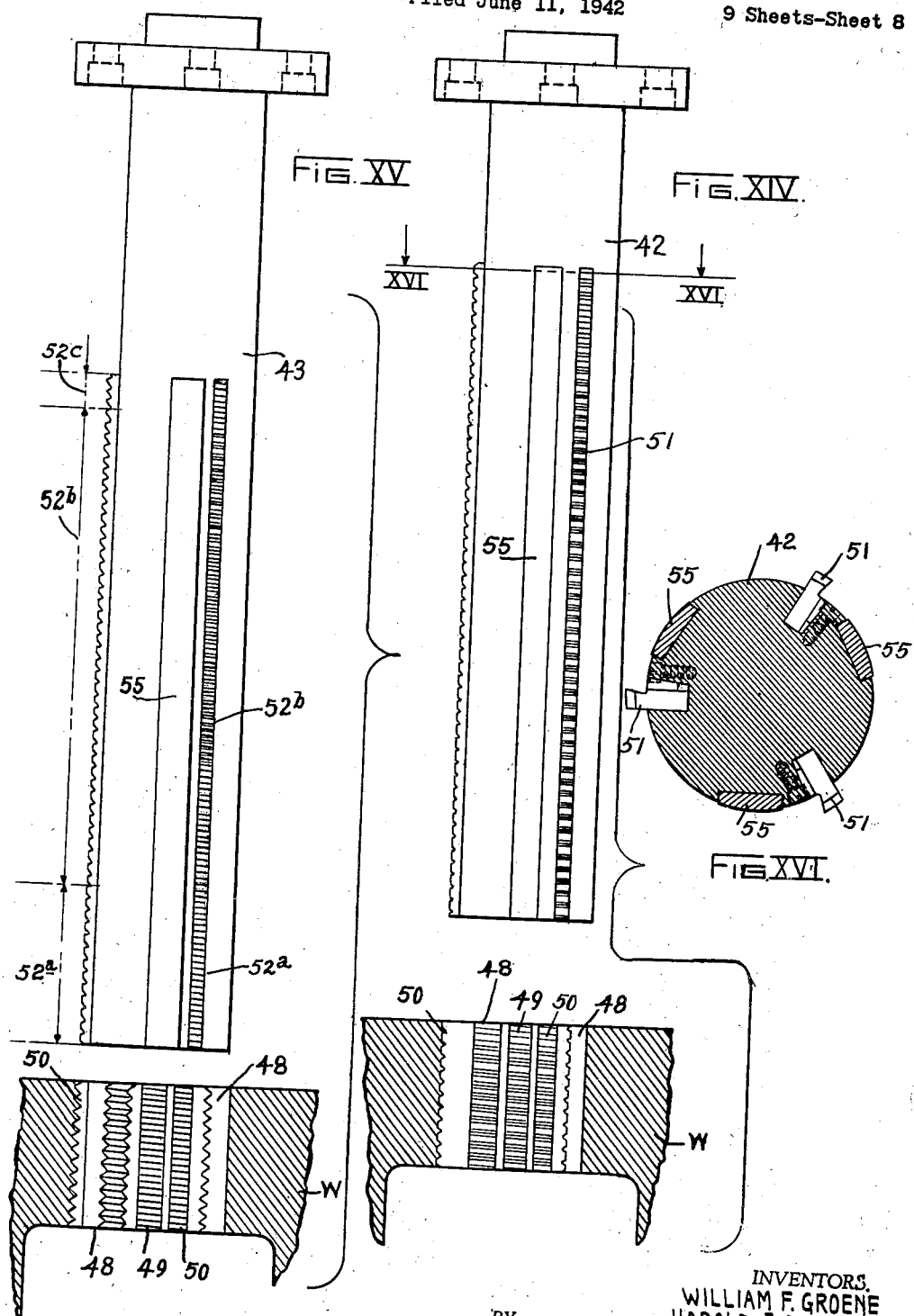
April 20, 1943.  W. F. GROENE ET AL  2,317,099
STEP THREADING MACHINE
Filed June 11, 1942   9 Sheets-Sheet 8
INVENTORS.
WILLIAM F. GROENE
HAROLD J. SIEKMANN
BY

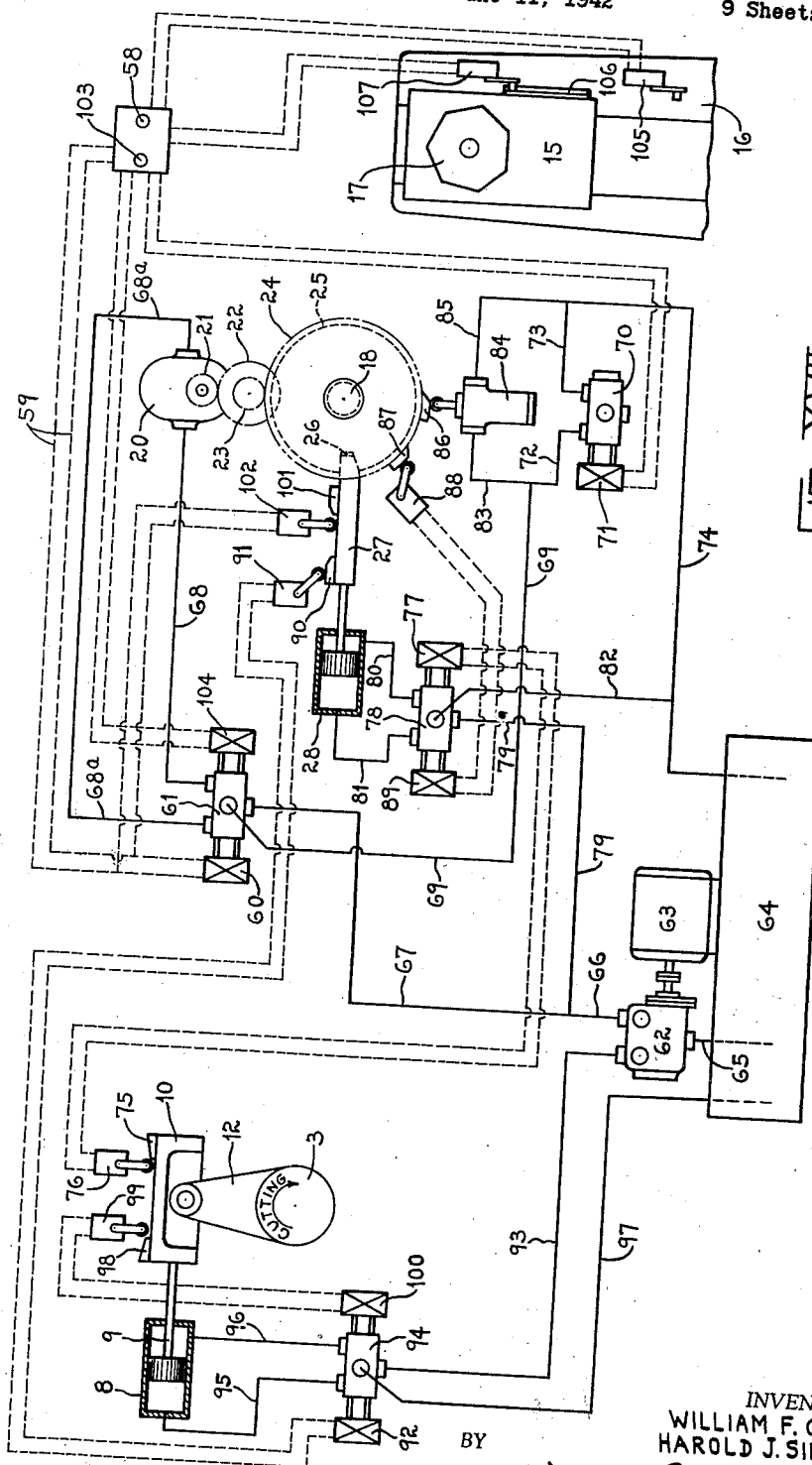
April 20, 1943.　　W. F. GROENE ET AL　　2,317,099
STEP THREADING MACHINE
Filed June 11, 1942　　9 Sheets-Sheet 9
FIG. XVII
INVENTORS.
WILLIAM F. GROENE
HAROLD J. SIEKMANN
BY
Willard S. Groene

UNITED STATES PATENT OFFICE 2,317,099

STEP THREADING MACHINE

William F. Groene and Harold J. Siekmann, Cincinnati, Ohio, assignors to The R. K. Le Blond Machine Tool Company, Cincinnati, Ohio, a corporation of Delaware Application June 11, 1942, Serial No. 446,631

19 Claims. (Cl. 10—130)

This invention pertains to the rapid finishing of step threads on work pieces, and is particularly related to the machining of step threads in breech rings of ordnance. One of the chief objects of the invention is to provide an arrangement whereby the various step threads to be cut in the breech rings are successively finished by a series of rotary shaping operations in which each series of step threads of different diameters are first roughed out and then semi-finished, and then a final finishing tool is provided to simultaneously take a light cut off of all of the step threads simultaneously so as to finish them with a high degree of accuracy and lead relationship to one another when finally completed.

In order to carry out applicants' invention it is the plan to provide an oscillating or rocking work holder to which is mounted the work piece or gun breech ring to be step threaded. This work holder is oscillated or rocked back and forth at feeding speeds so as to effect the cutting action of the tool on the step threads of the work piece. It is then the plan to provide a series of cutting tools or taps having a series of step threads formed longitudinally thereon corresponding in lead and configuration to the step threads to be formed on the work piece. It is then the plan to advance this tap, which is held rigid against rotation around its axis, by successively indexing the tap axially one lead of the thread for each rocking motion of the work piece carried by the rocking work holder. This tapered arrangement of step threads on the tap therefore successively cuts deeper and deeper into the threaded portion of the work being machined as the tap is indexed axially or longitudinally into the work.

It is a further object to provide, in conjunction with this arrangement, means for successively presenting different shaped taps of different degrees of stepped threads and other with straight thread arrangement so as to provide roughing and finishing cuts on the various stepped threads of the work to be machined.

It is a further object to provide in this series of cutting taps an arrangement whereby each tap is adapted to machining one size of step thread of definite diameter and that a next tap then takes up the next sized stepped thread and still another tap finishes the final thread to be step cut. It is the object to provide a final finishing tap which may be likewise indexed axially longitudinally into the work piece so as to provide a final finishing cut on all of the step threads for accurately sizing them in correct dimensions and lead relationship to one another.

Further features and advantages of this invention will appear from the detailed description of the drawings, in which:

Figure I is a front elevation, particularly showing the indexing turret for the step threading tap and the relationship of the rocking work holder thereto.

Figure II is a left hand end elevation of the machine shown in Figure I particularly showing the indexing screw and mechanism associated therewith for longitudinally indexing the various cutting taps when presented at the work spindle.

Figure III is a planned view of the machines of Figures I and II particularly showing the general position of the rocking mechanism for the work holder and the indexing mechanism for the turret carrying the various step threading taps.

Figure IV shows the first operation to be performed on the work piece, the breech ring of a gun, shown partly in section on the line IV—IV of Figures II, III, and XI, comprising the roughing tap for the small diameter step thread of the breech ring.

Figure V shows the finishing of the semi-finishing tap or second cut tap for completing the rough machining of the small diameter step thread in the breech ring.

Figure VI shows the roughing tap for the intermediate size step thread of the breech ring.

Figure VII is the semi-finishing tap associated with the roughing tap of Figure VI for semi-finishing the intermediate size step thread of the breech ring.

Figure VIII is the final roughing tap for completing the largest diameter step thread of the breech ring.

Figure IX shows the semi-finishing tap for this large diameter step thread of the breech ring.

Figure X shows the finishing tap for simultaneously taking a finished cut off of all of the different size step threads at one time to complete them to accurate size finished dimension.

Figure XI is a section on the line XI—XI of Figures IV and V, particularly showing the tap steadying support above the work piece being machined.

Figure XII is a similar view of that of Figure XI on the line XII—XII of Figures II, IV, V, and XII, also showing the relationship of the tap supporting member and its relationship to the step thread being cut.

Figure XIII is an end view on the line XIII—XIII of Figure X particularly showing the end view of the cutter for simultaneously finishing all of the step threads in one operation.

Figure XIV is an enlarged view of one of the roughing taps for operating on the small step thread of the breech block showing its continuously tapered or step arrangement of threads.

Figure XV is the semi-finishing or second cut tap which follows the tap of Figure XIV showing the straight or pick-up portion which coincides with the last portion or upper portion of the tap of Figure IV, the tapered cutting section, and the straight portion for finally cleaning up the step thread to semi-finish dimension.

Figure XVI is an enlarged sectional view on the line XVI—XVI of Figure XIV particularly showing the detailed arrangement of mounting the various cutting teeth on the tap and also the hardened wear strip which cooperate with the tap supporting member above the work piece.

Figure XVII is a diagrammatic layout of the hydraulic-electric control mechanism for operating the machine in its various functions.

This invention is shown applied to a machine comprising a base 1 upon which is fixed the upright column 2 constituting the main frame of the machine. In the base 1 is vertically journaled the work spindle 3 in suitable bearings 4 and 5 for both rotary and axial movement. Axial movement of the work spindle in exact lead relationship to the step thread T to be cut in the work piece W is provided by means of the split nut 6 carried in the base 1 and suitably adjustable with a mating thread 7 formed on the work spindle 3 so as to operate with back lash free connection with the work spindle to cause it to rise and fall with the rocking motion of the work spindle during the cutting operation.

The work spindle 3 is rocked through an arc just slightly greater than the segmental extent of each of the step threads to be cut and is rocked at a feeding speed so that when a cutting tool is applied to the work piece W cutting action will take place due to the rocking motion of the work spindle 3 and its work piece W. This rocking motion is effected by an appropriate hydraulic cylinder 8 carried on the base and which has its piston rod 9, Figure III, appropriately connected to the cross head 10 also slidably mounted in suitable guideways 11 in the base 1. On the work spindle 3 is fixed the actuating arm 12 which is connected through a suitable sliding block connection 13 with the cross head 10 so that reciprocation of the piston rod 9 of the cylinder 8 causes corresponding rocking motion in the work spindle 3 and the work piece W mounted thereon by suitable clamping means 14.

Movable vertically, in indexable motion, is the tool carriage 15 mounted on suitable dove tail guideways 16 and which carries the indexable tool turret 17 for movement to and from the work spindle 3 and its work W. This tool carriage 15 is actuated in indexing motion by means of an appropriate rotatable screw 18 journaled against axial movement in the column 2 and which operates in a nut portion 19 of the carriage 15 so that rotation of the screw 18 effects vertical sliding movement of the carriage 15 on the ways 16. The screw 18 is driven by a suitable hydraulic motor or any other equivalent means 20 fixed to the column 2 and which has a driving pinion 21 driving to the compound gears 22 and 23 to the main indexing gear 24 fixed to the screw 18 so that rotation of the motor 20 effects rotation of the screw 18. Associated with the gear 24 and screw 18 is the indexing ring 25 having an appropriate indexing notch 26 in which operates the indexing pin 27 when actuated by the fluid pressure indexing cylinder 28 carried in the column 2 of the machine. The indexing notch 26 is so arranged that one complete revolution of the gear 24 rotates the screw 18 so as to move the carriage 15 exactly one lead or one longitudinal spacing of the thread to be cut on the work piece W. The indexing driving motor 20 is timed so as to operate to rotate the gear 25 from one indexed position of notch 26 and plunger 27 around to the next position of engagement of the plunger 27, whenever the work spindle has been rocked back to its initial starting position for making a cut of the tool over the step threads. Suitable hydraulic control means (not shown) may be employed to maintain this synchronous operation of the hydraulic indexing motor 20 and the spindle rocking cylinder 8.

The tool carrying turret 17 is mounted on the carriage 15 by means of a swiveling connection 29 which may effect clamping of the turret 17 to the carriage 15 by binding together to the clamping segments 30 and 31 through the medium of the toggle clamp 32 operated by the segmental gear 33 and the fluid pressure cylinders 34 and its rack 35 on piston rod 36 of the cylinder 34. In this way the member 17 is rigidly clamped to the member 15 during the cutting operation. The turret 17 is also accurately indexed to a series (in this case) of seven positions corresponding to the various different tools to perform work on the breech ring to be step threaded. This indexing mechanism comprises an indexing pin 37 carried in the carriage 15 and which may be moved into engagement with appropriate indexing holes 38 formed in the turret 17 and which index pin may be actuated by means of the actuating shaft 39 carried in the carriage 15 and having a pinion 40 formed on the indexing plunger 37 and the lower end of which rod 39 is provided with an actuating handle 41 for inserting or withdrawing the index pin 37 from one of the indexing holes in the turret 17.

On the tool turret 17 is appropriately mounted the various step threading taps 42 through 47, and 56 which may be successively presented on the work spindle axis 60 by rotation and indexing of the turret 17 by manipulating the fluid pressure actuated clamp 32 and the indexing handle 41 as described above.

In this particular illustrative case the work to be performed comprises that of step threading a breech ring W having three series of step threads; a small diameter series of three threads 48, an intermediate diameter series of step threads 49, and a large diameter series of step threads 50, note Figures XI and XII. The step threading taps 42 and 43 are provided for the purpose of rough cutting the small diameter step threads 48 by means of the tap 43. Similarly the step threading taps 44 and 45 respectively rough and semi-finish the intermediate step threads 49 while the step threading taps 46 and 47 rough machine and semi-finish machine the large diameter threads 50.

Each of the roughing step threading taps 42, 44 and 46 are constructed as shown in Figure XIV comprising three series of tapered cutting teeth 51 appropriately fixed on the main bar portion 42, 44, or 46 of the respective roughing taps, as shown in detail in Figure XVI. These cutting teeth 51 have successive stepped relationship to one another projecting more and more outwardly towards the upper portion of the tap so that as the tap is advanced in stepped indexing motion from tooth to tooth the teeth will each successively take a cut off of the step thread in the breech ring being machined until finally the tap has been advanced in this intermittent indexing motion completely through the work piece to a position 42a, 44a, or 46a as best seen in the respective Figures IV, VI, and VIII. In this way the teeth or the threads are initially roughed out on the various step threads of the breech ring.

The semi-finishing tap is constructed as shown in detail in Figure XV and comprises a series of cutting teeth sections, three in number in this particular instance, 52 having a straight portion 52a which substantially coincides in cutting depth with that of the last teeth of the roughing tap of Figure XIV. An intermediate portion or cutting section 52b has a tapered section of arrangement of cutting teeth 52 so as to perform a cutting action as the tap is intermittently advanced in indexing motion through the work piece. The final section or last portion 52c of the tap is provided with a straight series of unstepped teeth which are moved through the work piece to accurately finally size the step threads for semi-finished dimension.

After having thus semi-finished machined each of the three series of step threads 48, 49 and 50, a single finishing tap 56 best shown in Figures X and XIII is employed for the purpose of simultaneously taking a light finishing cut off of all of the step thread portions 48, 49 and 50 at one time so as to accurately size them and to finish them in accurate relationship and axial spacing or lead of thread for each of the steps with respect to one another. This finishing tap is provided with a series of straight non-stepped cutting teeth 57 corresponding to every thread of the step threads to be cut in the breech ring and is fed in intermittent depth of movement through the work so as to take a finishing cut off of all of the step thread surfaces simultaneously.

In order to provide adequate and substantially rigid supporting of the outer end of the tap for accuracy and vibrationless cutting action a top supporting mechanism comprising a bracket 53 appropriately fixed on the column 2 and having a series of concave guide portions 54 which slidingly engage against hardened shoes 55 carried on each of the step threading taps so as the taps are moved longitudinally in intermittent indexing motion they are rigidly guided against any sidewise axial distortion by engagement of the shoes 55 with the portion 54 of the tap support. Thus rigid supporting of each of the taps at all times is provided during the cutting operation.

The general operation of the machine is substantially as follows:

After the work W has been placed on the rocking work spindle it is then oscillated through an arc just slightly greater than the angular circumferential extent of each step thread to be cut. This rocking motion takes place in a forward direction or clockwise direction as shown in Figures XI, XII, and XVII at a feeding rate commensurate with the cutting ability of the tap on the material being worked. The return rocking motion in the counterclockwise direction is effected very rapidly so as to quickly withdraw the work back to its initial starting position again for another rocking cutting movement. When the work reaches this return position the tool carriage slide 15 advances 1 thread lead or the spacing between the threads of the member to be step threaded so as to advance the broach or the tap for the next cutting stroke, the tapered arrangement of the teeth on the tap effecting the infeeding of the teeth for a cut every time the tap is advanced longitudinally one lead of the step thread. This proceeds until one of the taps, for example the tap 42, has completely passed through the work to the point 42a whereupon the work oscillation stops in the withdrawn position and the tap and carriage 15 are rapidly returned to the upward position clearing the tap of the work. The control handle 41 for the indexing pin 37 is then manipulated so as to withdraw this indexing plunger and permit rotation of the turret 17 with the fluid pressure clamp released by the hydraulic cylinder 34. The turret 17 is then rotated to bring the tap 43 into position and the similar progressive intermittent step indexing motion of this tap to the work during oscillation of the work in cutting motion takes place. This continues on around until all of the three step threads have been semi-finished thus bringing the finishing tap 48 to position for likewise finally finishing all of the step threads simultaneously to complete the work to accurate finished sized dimension. Appropriate conventional apparatus may be used for effecting the usual simultaneously and synchronous operation of the rocking motion toward the work spindles, the actuation of the screw 18 by the indexing motor 20 for appropriately advancing the carriage and indexing plunger 26 for stopping the screw in accurate position and for actuating the fluid pressure clamping cylinder 34 of a character shown in Figure XVII.

Figure XVII shows a preferred arrangement of the hydraulic and electric control mechanism for carrying out basic functions of this machine. To get the machine initially in operation the rapid traverse down button 58 is actuated which through suitable electric wiring and control apparatus 59 energizes the solenoid 60 of the control valve 61 whereupon fluid pressure from the fluid pressure pump 62 driven by a motor 63 delivers fluid under pressure from the reservoir 64 from the line 65 out through a pressure line 66 and 67 through the control valve 61 into the line 68 causing the hydraulic motor 20 to rotate, the discharge from this motor passing out through the line 68a, the control valve 61, the drain line 69, freely through the control valve 70, which has a solenoid 71 at this time actuated so as to permit free flow of the fluid from the line 69 through line 72 to the drain lines 73 and 74 back to the fluid reservoir 64. In this way, through the gearing 21, 22, 23, and 24, the actuating screw 18 is rotated in such a manner as to cause the downward rapid movement of the slide 15 carrying the turret 17 of the machine.

At this same time the cylinder 8 having a piston rod 9 is moved so as to move the crosshead 10 to the left in this figure moving the arm 12 and the work spindle 3 to the withdrawn position for beginning a cutting stroke. A dog 75 on the crosshead 10 at this time actuates a limit switch 76 comprising the solenoid 77 of the valve 78 permitting fluid pressure from the line 66 from the pump 62 to pass through the line 79 through the valve 78 and the line 80 into the cylinder 28 to thus withdraw the indexing plunger 27 out of the indexing disc 25 to permit free rotation of the screw 18 by the motor 20.

After the slide 15 and its turret and the first tap has been brought down to approximate cutting relationship with the work the rapid traverse is stopped by contact of the limit switch 105 by a dog 106 on the slide 15.

As soon as the slide 15 has been moved down to the desired position to begin the initial cutting operation of the first tap on the work piece and the rapid traverse stopped, the solenoid 71 of the valve 70 is so energized so as to close off direct connection between lines 72 and 73 and causing the discharge from line 69 to pass out through line 83, the deceleration valve 84, and the line 85. A dog 86 on the index disc actuates the deceleration valve 84 and renders it operative just after the control button 58 has been cancelled out by limit switch 105 causing a restriction of flow from line 83 to 85 and thus reducing the rate of rotation of the hydraulic motor 20 to a relatively slow speed as the indexing notch 25 comes into approximate position for engagement by the plunger 27. Immediately after the operation of the deceleration valve 84 and just before the index notch 26 is engaged by the indexing plunger 27 a dog 87 actuates a limit switch 88 which energizes the solenoid 89 of the valve 78 to connect fluid pressure from line 79 into line 81 to rapidly press the plunger 27 against the disc 25 and as the disc slowly rotates into exact aligned position the plunger 27 immediately snaps into the indexing notch 26. Discharge from the cylinder 28 under these conditions takes place through the line 80, the valve 78, the line 82, and line 74 into the fluid reservoir 64.

As the index plunger 27 is snapped into the index notch 26 a dog 90 moved and carried by the plunger 27 actuates a limit switch 91 which in turn causes energizing of the solenoid 92 of control valve 94 so that fluid pressure from the pump 62 may be transmitted through the line 93, the control valve 94, and the line 95 to the cylinder 8 to cause the crosshead 10 and the work spindle 3 to rock in cutting direction effecting the first cut on the work piece. Discharge under these conditions passes out through line 96, the control valve 94, and the drain line 97 back to the fluid reservoir.

As the crosshead 10 and work spindle 3 reach the end of their cutting stroke the dog 98 actuates a limit switch 99 energizing solenoid 100 of control valve 94 reversing the flow of high pressure from line 93 into line 96 so as to begin immediate withdrawal of the piston rod 9 and the crosshead 10 away from cutting direction. Discharge of course at this time passes out through line 95, valve 94, and line 97 back to the fluid reservoir 64.

As soon as the crosshead 10 again reaches its withdrawn position ready to begin another cutting cycle its dog 75 actuates the limit switch 76 which energizes solenoid 77 of control valve 78 so as to again withdraw the indexing plunger 27 as described. At the same time a dog 101 carried by the index plunger 27 actuates the limit switch 102 which in turn automatically actuates or energizes the solenoid 60 of control valve 61 to again set the hydraulic motor 20 in operation for rotating the screw 18 one complete revolution going through the decelerating cycle as effected by the valve 84 and again being locked by the plunger 27 entering the notch 26 in actuating limit switch 88 as already described.

This cycle of operation continues progressively until the cutting tap has moved completely through the work as described above. When this point has been reached a rapid traverse return button 103 may then be actuated which energizes solenoid 104 of control valve 61 to cause reversal of operation of the hydraulic motor 20 and thus reverse rotation of the screw 18 at a rapid continuous rate to move the carriage 15 to the upper withdrawn position out of the work piece. This upper rapid traverse motion is stopped by engagement of the dog 106 with limit switch 107. At the same time the button 103 is pressed the solenoid 77 is also energized so as to withdraw the indexing plunger 27 and also the solenoid 100 of control valve 94 is likewise held energized so as to maintain the crosshead 10 and work spindle 3 in the withdrawn inoperative position.

Having thus fully set forth and described our invention what we claim as new and desire to secure by United States Letters Patent is:

1. In a machine tool, a rocking work spindle, a tool carrier movable relative to said rocking spindle, a cutting tool on said carrier, and means for intermittently moving said cutting tool relative to said work spindle in timed relationship to the rocking movement of said spindle.

2. In a machine tool, a rocking and axially movable work spindle, a tool carrier movable relative to said work spindle, a cutting tool on said carrier, and means for intermittently moving said tool axially of said work spindle in timed relationship to the rocking and axial movement of said work spindle.

3. In a machine tool, a rocking work spindle, a tool carrier movable relative to said work spindle, a series of cutting tools on said tool carrier, means for successively presenting each of said tool carriers in working position relative to said work spindle, and means for intermittently moving each of said cutting tools when in working position relative to said work piece in timed relationship to the rocking movement of said work spindle.

4. In a machine tool, a rocking and axially movable work spindle, a tool carrier, intermittently movable relative to said work spindle in timed relationship to the rocking and axial movement of said spindle, a series of cutting tools on said tool carrier, and means for successively presenting each of said cutting tools to working position for axial movement relative to said work spindle in predetermined relationship to the rocking movement of said spindle.

5. In a machine tool, a rockable work spindle, means for rocking said work spindle through a predetermined arc of movement, a tool carriage, means for intermittently moving said tool carriage relative to said work spindle in timed relationship to the rocking motion of said spindle, and cutting tools on said carriage movable relative to a work piece on said work spindle.

6. In a machine tool, a rockable work spindle, means for rocking said work spindle through a predetermined arc of feeding movement, a tool carriage movable axially relative to said work spindle, indexing mechanism for moving said carriage intermittently a predetermined distance of accurate travel in a predetermined relationship to the rocking motion of said work spindle, and cutting tool means on said carriage effective to operate upon work pieces on said work spindle.

7. In a step threading machine, a rotatable and axially movable work spindle, means for actuating said work spindle in rocking and axial movement, a tool carriage movable axially relative to said work spindle, indexing means for intermittently moving said tool carriage predetermined distances of relative travel with respect to said work spindle and in timed relationship to the rocking and axial movement of said spindle, and tool means on said carriage operable upon a work piece on said work spindle.

8. In a step threading machine, a rotatable and axially movable work spindle, means for actuating said work spindle in rocking and axial movement, a tool carriage movable axially relative to said work spindle, indexing means for intermittently moving said tool carriage predetermined distances of relative travel with respect to said work spindle and in timed relationship to the rocking and axial movement of said spindle, and tool means on said carriage operable upon a work piece on said work spindle, said tool means comprising a plurality of cutting tools mounted on an indexable turret on said carriage for successive presentation of each of said cutting tools in working position relative to the work piece in said work spindle.

9. In a step threading machine, a frame, a rotatable and axially movable work spindle journaled in said frame, means for rocking said work spindle through an arcuate path of feed travel, means for effecting axial displacement of said work spindle when moved through its rocking motion, a tool carriage movably mounted on said frame for movement axially of said work spindle, indexing means for accurately intermittently moving said carriage predetermined distances of travel relative to said work spindle in a predetermined relationship to the rocking motion of said work spindle, and tool means on said carriage arranged to operate upon a work piece on said work spindle.

10. In a step threading machine, a frame, a rotatable and axially movable work spindle journaled in said frame, means for rocking said work spindle through an arcuate path of feed travel, means for effecting axial displacement of said work spindle when moved through its rocking motion, a tool carriage movably mounted on said frame for movement axially of said work spindle, indexing means for accurately intermittently moving said carriage predetermined distances of travel relative to said work spindle in a predetermined relationship to the rocking motion of said work spindle, and tool means on said carriage arranged to operate upon a work piece on said work spindle, said tool means comprising a turret rotatably mounted on said carriage, means for clamping said turret to said carriage, and means for moving and indexing said turret at a plurality of different positions so as to present each of a plurality of tools mounted thereon to working position relative to said work spindle.

11. In a step threading machine, a rocking and axially movable work spindle, a tool carriage movable relative to said work spindle, a cutting tool on said tool carriage comprising a relatively long tap-shaped tool having a series of stepped cutting teeth, and means for intermittently indexing said carriage and tap relative to said work spindle in a predetermined relationship to the rocking motion of said work spindle.

12. In a step threading machine, a rotatable and axially movable work spindle, a tool carriage movable relative to said work spindle, a cutting tool on said tool carriage comprising a relatively long tap-shaped tool having a series of stepped cutting teeth, and means for intermittently indexing said carriage and tap relative to said work spindle in a predetermined relationship to the rocking motion of said work spindle, and further tap-shaped cutting tool devices on said carriage adapted to be successively presented in working position and intermittently indexed relative to said work piece in timed relationship to the rocking motion of said work spindle.

13. A method of machining an arcuate surface on a work piece comprising the steps of: (a) rocking a work piece through an arcuate path of travel; step (b) of presenting a cutting tool to said work piece; and the step (c) of moving said cutting tool axially of said work piece in timed relationship to the rocking motion of said work piece.

14. A method of machining an arcuate surface on a work piece comprising the steps of: (a) rocking and axially moving a work piece in feeding motion; step (b) of presenting a cutting tool to said work piece while moving in said rocking and axial movement; and step (c) of intermittently moving said cutting tool axially of said work piece in predetermined distances of travel in timed relationship to the rocking and axial movement of said work piece.

15. In a method of cutting step threads on a work piece: the step (a) of rocking and axially moving a work piece to be step threaded; step (b) of presenting to said work piece a series of cutting teeth of the same configuration of the threads to be cut on said work piece; and the step (c) of intermittently moving said cutting teeth parallel to the axis of rocking motion of said work piece in predetermined distances of relative travel in timed relationship to the rocking motion of said work piece.

16. A method of machining the step threads in breech rings comprising the steps of: (a) rocking the breech ring in feeding motion through an arcuate path of travel just slightly greater than the circumferential extent of a step thread of said breech ring and axially moving said breech ring in a helical path of travel equal to the helix angle of the thread to be cut on said breech ring; (b) of presenting to said step threads of said breech ring a cutting tap having a series of cutting teeth conforming to the configuration of the thread to be cut on said step thread portions of said breech ring; and (c) of intermittently indexing said tap longitudinally of the axis of rocking motion of said breech ring a distance of one lead of the step thread to be cut for every rocking motion of said breech ring.

17. A method of machining the step threads in breech rings comprising the steps of: (a) rocking the breech ring in feeding motion through an arcuate path of travel just slightly greater than the circumferential extent of a step thread of said breech ring and axially moving said breech ring in a helical path of travel equal to the helix angle of the thread to be cut on said breech ring; (b) of presenting to said step threads of said breech ring a cutting tap having a series of cutting teeth conforming to the configuration of the thread to be cut on said step thread portions of said breech ring; and (c) of intermittently indexing said tap longitudinally of the axis of rocking motion of said breech ring a distance of one lead of the step thread to be cut for every rocking motion of said breech ring; and (d) of successively presenting a series of different cutting taps each adapted to rough and finish a step thread portion of said breech ring.

18. A method of machining the step threads in breech rings comprising the steps of: (a) rocking the breech ring in feeding motion through an arcuate path of travel just slightly greater than the circumferential extent of a step thread of said breech ring and axially moving said breech ring in a helical path of travel equal to the helix angle of the thread to be cut on said breech ring; (b) of presenting to said step threads of said breech ring a cutting tap having a series of cutting teeth conforming to the configuration of the thread to be cut on said step thread portions of said breech ring; (c) of intermittently indexing said tap longitudinally of the axis of rocking motion of said breech ring a distance of one lead of the step thread to be cut for every rocking motion of said breech ring; (d) of successively presenting a series of different cutting taps each adapted to rough and finish a step thread portion of said breech ring; and the step (e) of presenting a final finishing cutting tap to said breech ring for simultaneously machining all of the step threads of all of the steps of said breech ring in one operation.

19. In a step threading machine for breech rings, a frame, a rotatable and axially movable work spindle carried in said frame, means for effecting the rocking and axial movement of said spindle, a tool carriage movable relative to said work spindle, a tool turret rotatable and indexable on said carriage, a series of cutting taps carried by said turret and adapted to be presented to working position relative to said work piece by said turret, and supporting means on said frame for engaging said tap adjacent to the work piece being cut so as to steady said tap during its cutting operation on a work piece on said work spindle.

WILLIAM F. GROENE.
HAROLD J. SIEKMANN.